July 15, 1930.  W. A. COLLINGS ET AL  1,770,767
SOUNDPROOFING BUILDING MATERIALS
Filed Nov. 12, 1926
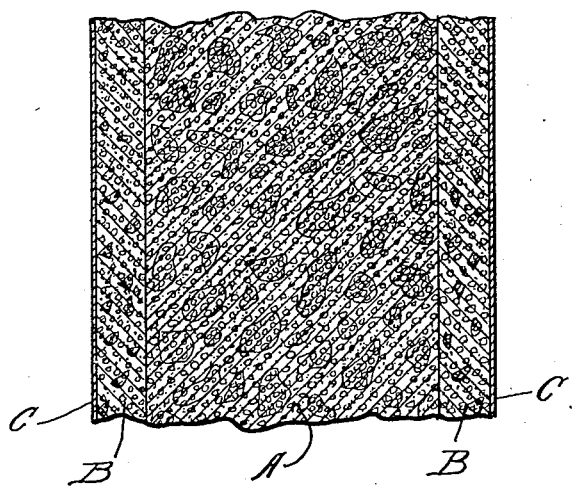

Patented July 15, 1930

1,770,767

UNITED STATES PATENT OFFICE

WILLIAM A. COLLINGS, OF SANTA MONICA, CALIFORNIA, AND ROY CROSS, OF KANSAS CITY, MISSOURI, ASSIGNORS TO SILICA PRODUCTS CO., OF LOS ANGELES, CALIFORNIA, A CORPORATION OF DELAWARE

SOUNDPROOFING BUILDING MATERIALS

Application filed November 12, 1926. Serial No. 147,941.

This invention relates to the building of floors, walls and similar elements of construction of a character such that the sound reverberations from the walls and transmission through the walls is limited, and refers more specifically to a construction which prevents transmission of sound and also prevents the reflection of sound by the use of cellular mineral aggregate held together by a binder in such a way that a maximum of air cells is produced. The problem of making a room most satisfactory from an acoustical standpoint consists in making partition walls with the greatest possible insulating value against sound, at the same time having them as thin as possible and structurally strong. The element also of preventing reflection of sound from such partitions is of great importance. Ordinarily a surface having the greatest ability to absorb sound is easily penetrated by sound or is structurally weak. Another element in such a partition wall consists in having a surface which is sanitary and which allows the penetration of the sound without reflection.

As an illustration of this type of partition or structure, Figure I shows a cross-section of a partition wall. This partition wall consists of three elements:

(A) is a composition of cellular mineral aggregate held together with a binding agent. This binding agent may be hydraulic cement, Keene's cement or bituminous cement. The cellular mineral aggregate may be pumice, tufa, aggrelite or material such as is described in Patent No. 1,314,752 and co-pending applications of the present inventors. The binding material may, if desired, be emulsified with air so that it presents a maximum number of air cells. It is to be noted that much of the virtue of this cellular mineral aggregate lies in the fact that the cells are filled with a minimum of gas produced in heating argillaceous material to incipient intumescence. The intumescence is caused by the expanding of gases or water vapor and when the material has cooled practically a vacuum exists in these cells. As is well known, sound cannot travel through a vacuum, and therefore such cellular mineral aggregate offers the ideal insulating material against sound. Small vials or bottles evacuated by any means may be used to furnish the necessary sound insulation cells or cellular agregate.

In addition to offering such insulating properties, this aggregate is structurally equal to ordinary sand and rock, and when mixed with bituminous binder will make a structure as strong as one made in a similar manner from sand and rock. For example, Portland cement concrete made with this material will have a crushing strength, with a mixture of one part of cement, two parts of fine cellular material and four parts of coarse cellular material, at twenty-eight days, of about three thousand (3,000) pounds per square inch, which is essentially the same strength as a sand and rock mixture. Although this construction is particularly designed for soundproofing, it has other highly advantageous properties, such as light weight one-half or two-thirds that of normal concrete, and a heat insulation value several times that of ordinary concrete. While natural cellular material may be used, it is not as satisfactory as an artificial product as herein described.

A second element in the sound-proof partition, is indicated by (B) in the diagram. This material is made essentially the same as (A), except that it is desirable to have the interstices between mineral particles largely filled with air, and that the portion of cementing material be relatively small as compared with A. The purpose of this is to allow the sound to enter the interstices with a minimum of reflection. While in many instances this may be the exposed or wearing surface of the partition, in most cases the finish is too rough and the cementation is too slight to withstand abrasion.

This makes it important to add a third coat (C). The coat B acts as a sound absorbent and also prevents penetration of sound, but not to the degree of A. The coat C must provide for easy penetration of sound, its purpose being to prevent excessive mechanical abrasion on B. It is desired that it should not reflect and should allow easy penetration of sound waves. For this reason, it may consist of a flexible coat of any type, such as paper, matting, wood pulp, rubberized cloth, oil cloth or varnish coats, and it also provides a sanitary surface material. (B) may be cemented with plaster of Paris, or any hydraulic cement or even a bituminous binder of the proper character. The coat C may be applied in the same way that wall paper is applied, or, in fact, it may be ordinary wall paper; or it may be applied with a brush or spray in the form of an oil varnish. Coat B would be applied normally with a trowel,—A being the structural element applied either in forms or as blocks or tiles. In the case of both A and B, it is always desirable to use some plasticising agent, such as bentonite. This aids in making it possible to intermix air with the binder on account of increasing the viscosity and the plasticity of the mix. Instead of using air, much the same effect is obtained by using a large amount of the bentonite or gelatinizing clay with a large amount of water,—the water drying out later to form voids. Porosity may also be obtained by putting in the mix limestone dust and phosphoric acid, thus forming carbon dioxide filled cells.

A typical mix for A would be as follows:

| | |
|---|---|
| Hydraulic cement, such as Portland cement, alumina cement and natural cement, or plaster of Paris | 1 part by volume |
| Fine cellular aggregate of the size of ordinary sand retained on a 10-mesh screen, and made by burning argillaceous material | 2 parts |
| Coarse cellular aggregate made by burning argillaceous material | 4 parts |
| Gelatinizing clay | 1/16 of 1 part |
| Water | 1¼ parts |

A typical finished mix would have the composition as follows:

| | Per cent |
|---|---|
| Cement | 10 |
| Cellular sand and rock | 74 |
| Water | 15 |
| Gelatinizing clay | 1 |

It is optional, in some instances, to replace part of the sand or part of the gelatinizing clay with diatomaceous earth,—thus giving greater porosity and sound absorbing qualities. However, it must be borne in mind that the sound insulation properties are most largely due to the cells existing within the aggregate itself. Of course, when plaster of Paris is used, the water content may be considerably increased. It may also be noted that A may be used with or without either or both B or C on either or both sides.

Coats A and B may also include such binders and fillers as hair, straw, wood pulp, newspapers, asbestos, or any fibrous or cellular material. Pulp pellets, dried and mixed with the plaster coat B, are very useful in sound absorption. The wood pulp pellets may be waterproof with waxy material such as paraffin before mixing. Typical mixes would be as follows:

| | a | b |
|---|---|---|
| | Per cent | Per cent |
| Hydraulic cement | 10 | 15 |
| Cellular sand | 20 | 20 |
| Cellular rock | 45 | 25 |
| Wood pulp or paper pulp pellets | 20 | 30 |
| Wood pulp or fibrous material loose | 4 | 5 |
| Bentonite | 1 | 5 |

We claim as our invention:

1. Soundproof structural elements comprising a section composed of a layer of relatively coarse cellular aggregate, the cells of which are non-communicative with each other, a second layer bonded thereto, the aggregate being of relatively smaller size and of a similar nature, and a flexible surface coat on the latter layer low in sound-reflecting properties.

2. Soundproof structural elements comprising adjacent and bonded layers made of mineral aggregate, said aggregate having a cellular structure with a maximum of non-communicating cells, the aggregate in one layer being of relatively coarser material than the other and a surface coat low in sound-reflecting properties.

3. Soundproof structural elements comprising adjacent layers made of mineral aggregate having an intra-cellular structure with a maximum of non-communicating cells, the aggregate in one layer being of relatively coarser material than the other, and a surface coat low in sound-reflecting properties bonded to the layer of smaller sized aggregate.

4. Soundproof structural elements comprising adjacent and bonded layers made of mineral aggregate, said aggregate having a cellular structure with a maximum of non-communicating cells, the aggregate in one layer being of relatively coarser material than the aggregate in the other.

5. Soundproof structural elements comprising adjacent and bonded layers made of mineral aggregate, said aggregate having a cellular structure with a maximum of non-communicating cells, the aggregate in one layer being of relatively coarser material than the aggregate in the other, the exposed layer being that containing the aggregate of smaller size.

6. Soundproof structural elements comprising adjacent layers made up of mineral aggregate, the aggregate having a cellular structure with a maximum of non-communicating cells, the aggregate in one layer being of relatively coarser material than the other.

7. A wall or ceiling comprising a base structure of normal strength containing a large percentage of vacuum cells and resistant to the passage of sound waves, on which is placed a layer with high absorptive and low reflecting properties as to sound, this layer in turn being covered by a relatively smooth surface highly penetrative to sound.

8. A partition structure comprising a base element resistant to the transmission of sound waves and made from vacuum celled aggregate held together with a hardened paste of gelatinizing clay and cement.

9. A partition structure comprising a supported base element made from cellular mineral aggregate held together with a hardened paste of Portland cement, such base element being relatively impervious to the passage of sound waves, a covering of relatively small-sized mineral aggregate and cement mixed and hardened to give a porous structure with poor sound-reflecting properties.

10. A partition structure comprising a supported base element made from cellular mineral aggregate held together with a hardened paste of Portland cement, such base element being relatively impervious to the passage of sound waves, a covering of relatively small-sized mineral aggregate and cement mixed and hardened to give a porous structure with poor sound-reflecting properties.

WILLIAM A. COLLINGS.
ROY CROSS.